H. N. OTT AND F. H. BUFTON.
PROJECTION APPARATUS.
APPLICATION FILED OCT. 31, 1916.
1,341,665.
Patented June 1, 1920.
3 SHEETS—SHEET 1.
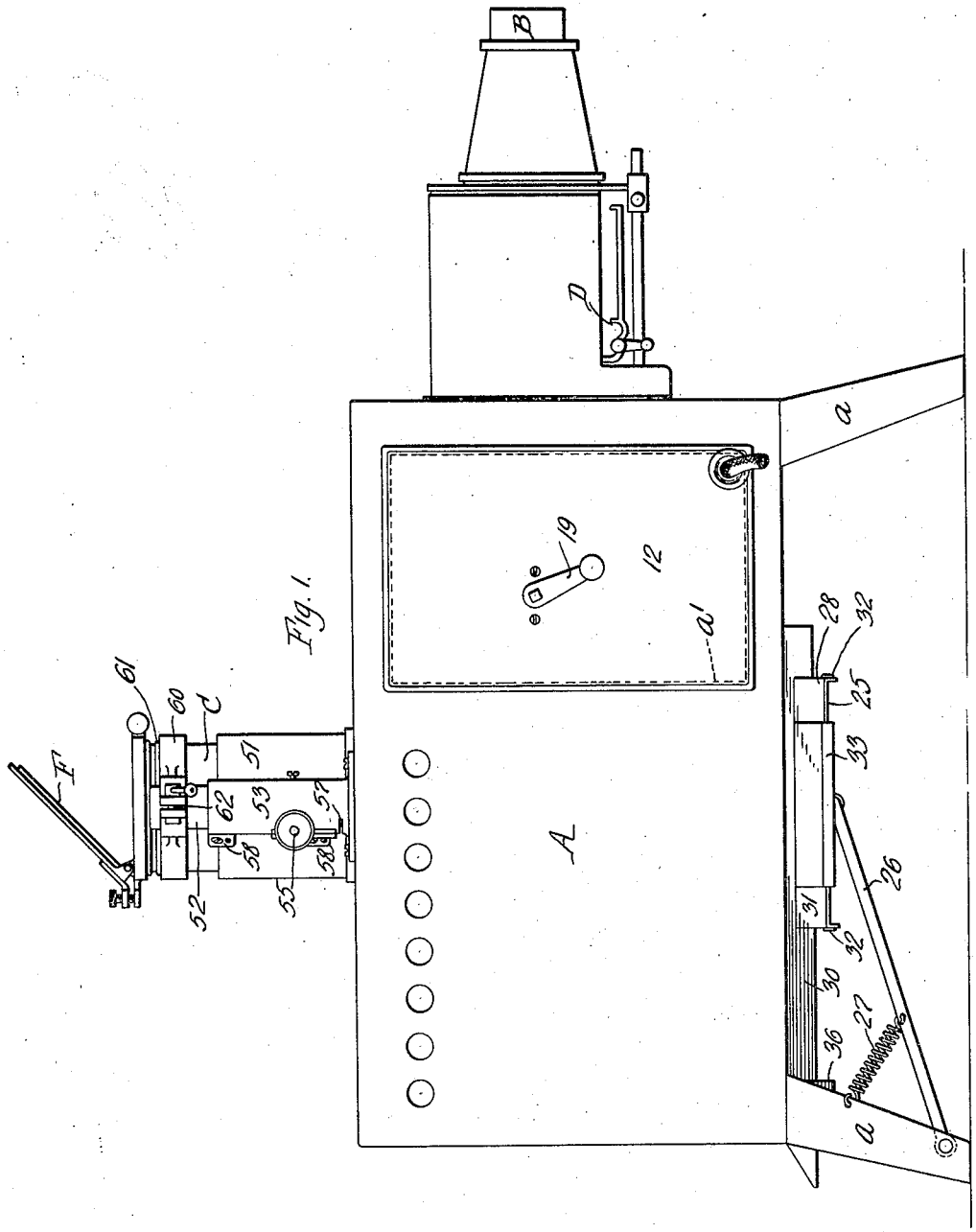
Inventors.
Harvey N. Ott,
and Frank H. Bufton.
by Wilhelm & Parker
Attorneys.

H. N. OTT AND F. H. BUFTON.
PROJECTION APPARATUS.
APPLICATION FILED OCT. 31, 1916.
1,341,665.
Patented June 1, 1920.
3 SHEETS—SHEET 2.
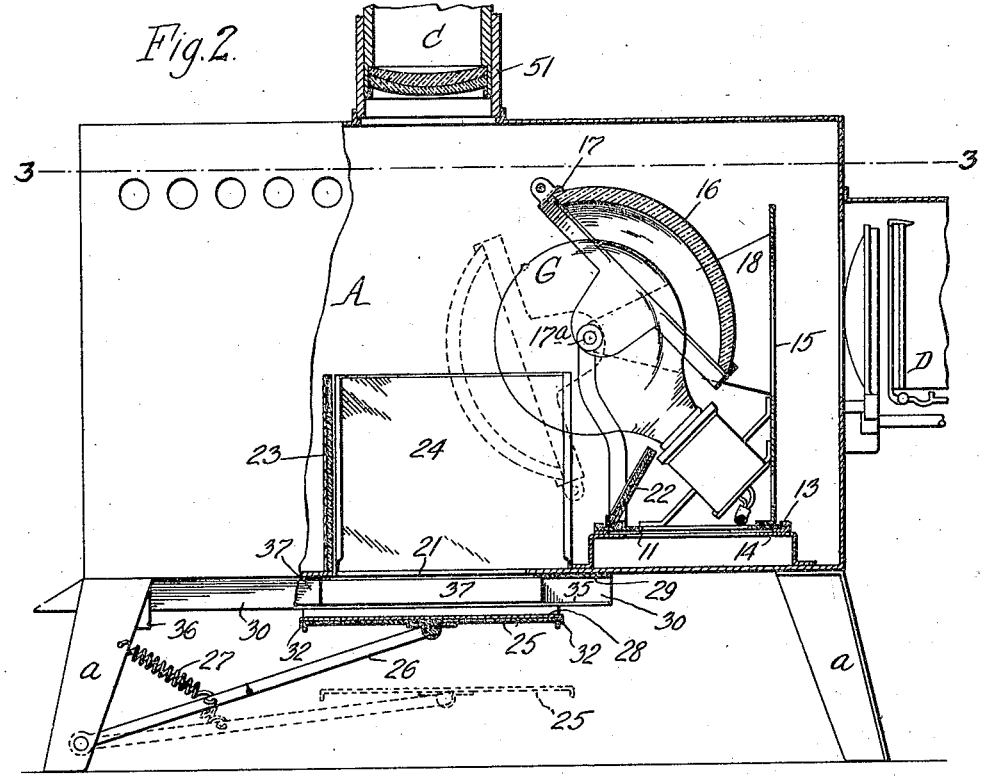
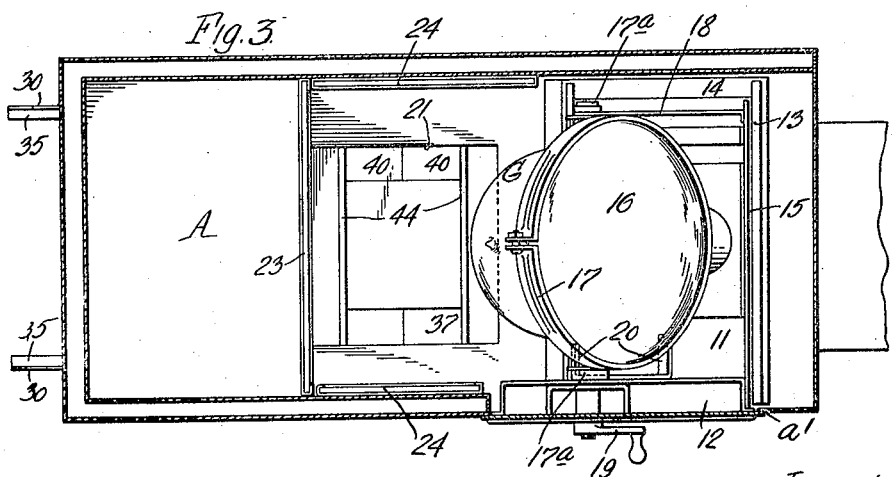
Inventors.
Harvey N. Ott,
and Frank H. Bufton,
by Wilhelm & Parker,
Attorneys.

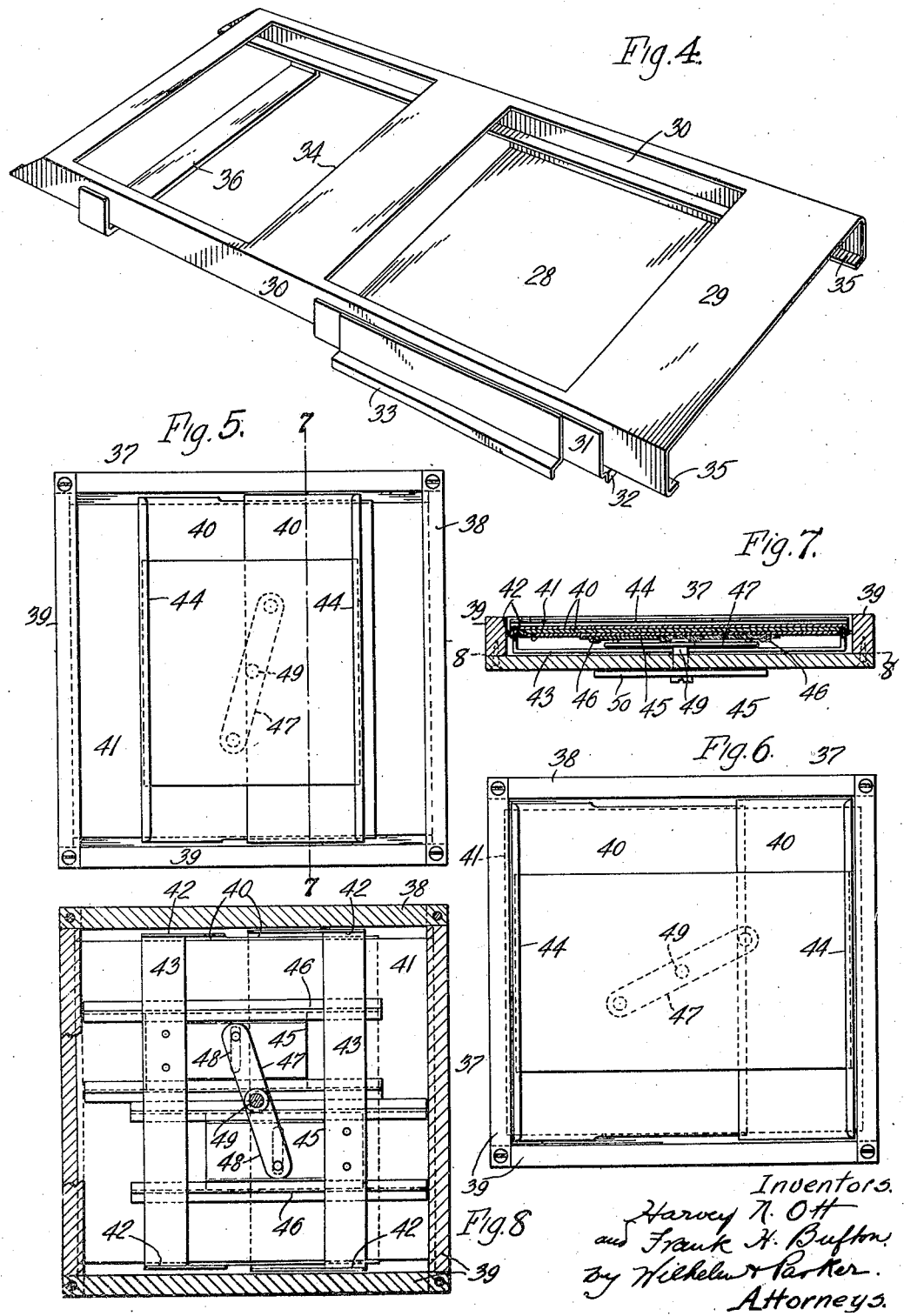

UNITED STATES PATENT OFFICE.

HARVEY N. OTT AND FRANK H. BUFTON, OF BUFFALO, NEW YORK, ASSIGNORS TO SPENCER LENS CO., OF BUFFALO, NEW YORK.

PROJECTION APPARATUS.

1,341,665. Specification of Letters Patent. Patented June 1, 1920.

Application filed October 31, 1916. Serial No. 128,699.

*To all whom it may concern:*

Be it known that we, HARVEY N. OTT and FRANK H. BUFTON, citizens of the United States, residing at Buffalo, in the county of Erie and State of New York, have invented a new and useful Improvement in Projection Apparatus, of which the following is a specification.

This invention relates to projection apparatus, more particularly of the sort used for projecting images from both transparent lantern slides or objects and opaque objects, such, for instance, as post cards and the like.

The object of the invention is to improve projection apparatus of this kind in various respects, among which may be specifically mentioned the following:

To provide improved holding and positioning means for the post cards or other opaque objects adapted to hold objects of different size, and similar objects in different positions, and to permit the card or object holders to be placed in and removed from operative position in the apparatus with the greatest facility and least inconvenience and discomfort to the operator.

In the accompanying drawings:

Figure 1 is a side elevation of a projection apparatus embodying the invention.

Fig. 2 is a side elevation of the apparatus partly in section, showing the illuminating means.

Fig. 3 is a sectional plan view thereof on line 3—3, Fig. 2.

Fig. 4 is a perspective view of the guide or retaining frame for the card holders.

Fig. 5 is a plan view of one of the card holders or slides, showing one adjustment of the holding members.

Fig. 6 is a similar view showing a different adjustment of the holding members.

Fig. 7 is a section thereof on line 7—7, Fig. 5.

Fig. 8 is a bottom plan thereof, partly in section on line 8—8, Fig. 7.

A represents the casing or light chamber of the apparatus. This casing may be of any suitable construction, preferably being a metal casing, provided with legs $a$ for supporting it above a table or support and having at one side an opening $a'$ through which a support carrying a lamp can be inserted into and removed from the casing.

B represents the objective for the transparent lantern slides or objects, and C represents the opaque projection objective. The objective B for the lantern slides is arranged at the front end of the casing and the other objective C at the top of the casing. The former objective, as usual, has associated with it suitable means D for supporting the lantern slides.

F represents an inclined mirror or reflector for directing the light rays forwardly from the objective C to the screen. The invention does not relate to the construction of these parts and they may be of any usual or suitable construction.

G represents an incandescent electric lamp or other usual or suitable source of light, which is preferably supported on a slide or carriage 11 arranged to slide into and out of the casing through the opening $a'$ in the side thereof. This carriage is provided at its outer end with an upright double walled cover plate 12 adapted to close the opening $a'$ when the carriage with the lamp is slid into place in the casing. The slide or carriage preferably consists of a horizontal metal plate arranged to slide in a guideway 13 provided on a raised supporting plate 14 secured in the bottom of the casing. Holes are shown in this supporting plate, in the carriage and in the bottom of the casing beneath the supporting plate to afford proper ventilation. The lamp can be mounted on the carriage in any suitable manner. As shown, the carriage is provided with a transverse upright support or plate 15 to which the lamp socket is secured. 16 represents a mirror for reflecting light from the lamp onto the opaque object or post card, which is supported as hereinafter described, face upward at the bottom of the casing beneath the objective C. The mirror is secured in a pivoted ring 17 which, as shown, is provided at opposite sides with journals $17^a$ arranged to turn in bearings in a bracket or support 18 and in the cover plate 12, and one of these journals projects out through a hole in the cover plate 12 and is provided at its outer end with a suitable handle 19 for swinging the mirror to and from its operative position, shown by full lines in Fig. 2. By swinging the mirror to the position shown by dotted lines in Fig. 2, the light from the lamp is permitted to pass directly into the objective B for the transparent lantern slides. 20 indicates suitable stops for arresting the mirror in its two positions. In the position shown by full lines in Fig. 2, the mirror, which has a concaved spherical reflecting surface substantially concentric with the source of light, reflects the rays downwardly at the inclination indicated, onto the opaque object or post card, which is supported in or below an exposure opening 21 in the bottom of the casing. 22 indicates a mirror supported in front of the opening 21 on the lamp carriage beneath the lamp, and 23 and 24 indicate upright mirrors arranged at the rear and opposite sides of the opening 21 in the bottom of the casing for concentrating the light rays on the opaque object.

By locating the lamp and mirror 16 in the front portion of the casing between the lantern slide objective B and the axial line of the other objective C, the lamp is near the objective B where the direct rays from the lamp will illuminate the lantern slide to the best advantage when the mirror 16 is swung back out of the way, and the stationary mirrors 23 and 24 located as shown, at the rear and sides of the opaque object can be larger than would otherwise be possible so as to concentrate the maximum light on the object and insure a complete and brilliant illumination thereof. The illumination is much more perfect than is possible with a lamp located in the rear portion of the casing back of the opaque object.

The means for holding the opaque object or post card comprises a horizontal table or support which is mounted beneath the casing to move toward and from the opening 21 in the bottom of the casing, a frame or guide which is supported on this table, and separate holders in which the cards or opaque objects are held and which are adapted to be placed in the guide frame and shoved horizontally along the same into and out of operative position below the opening 21 in the bottom of the casing and through which the object is exposed. The table, which is shown at 25, preferably consists of a thin horizontal square metal plate having down-turned stiffening flanges, and is hinged in any suitable manner to the free ends of arms 26 which are pivoted at their other ends to the supporting legs *a* or other stationary part of the projection apparatus. The table is adapted to swing with the supporting arms up and down toward and from the bottom of the casing and is held yieldingly up in the raised position by springs 27 connected to the arms 26 and to the legs of the casing. The guide frame is preferably made of sheet metal or thin metal plates and is composed of a horizontal bottom plate 28 of substantially the size of the table and adapted to rest thereon, and a top plate 29, the opposite sides of which are bent down to form the sides 30 of the frame and are suitably secured to up-turned flanges 31 at the sides of the bottom plate. The bottom plate is provided at opposite ends with down-turned flanges 32 adapted to straddle the table 25 to prevent endwise shifting of the guide frame on the table, and the guide frame is also preferably provided at its front or near side with a depending flange 33, preferably formed on a separate plate secured to the side of the frame, which is adapted to engage the corresponding edge of the table to properly position the frame on the table and prevent it from being shoved back out of the intended position. The top plate 29 of the frame is provided with a square opening which registers with the opening 21 in the bottom of the casing for the exposure of the object or card, and the top plate is also preferably provided near its rear end with another opening 34. The sides of the frame are provided with inwardly extending horizontal flanges 35 which form guides or tracks on which the card holders are adapted to be placed and slid through the guide frame. The rear ends of the sides of the guide frame with the tracks 35 preferably extend outwardly beyond the top plate so that the holders can be more readily placed on the guide tracks and shoved into the guide frame. 36 represents a connecting bar or strap which extends transversely beneath the rear end of the guide frame and is connected to the sides thereof by upwardly extending end portions for rigidly connecting and strengthening the rear end of the guide frame.

37 represents one of the separate holders for the cards or opaque objects. A plurality of these holders, preferably three, is supplied with the apparatus. A card or opaque object is placed in each holder and one holder is placed in the rear end of the guide frame. The next holder is then placed in the frame and shoved forwardly so as to push the first holder into position beneath the opening 21 in the bottom of the casing for exposing the picture or subject thereon. When it is desired to remove this subject and replace it with another one, a third holder is placed in the rear end of the frame and shoved forwardly, thereby shoving the second holder into position beneath the exposure opening and shoving the first holder out of the front end of the frame, where the operator can readily grasp it and remove it from the machine. This construction enables the operator to stand at the near or front side of the apparatus and readily place the card holders in the guide frame with one hand and remove them with the other hand without having to reach under or around the casing to the far side to reach the holders, as in apparatus in which the holders move transversely of the case. This is a decided advantage since the operator does not have to get close to the apparatus, which is hot, and is not liable to be burnt. Each of the card holders preferably consists of a shallow wooden tray or frame 38 of substantially square shape having upright side walls or flanges 39, and opposite card holding plates or members 40 which are mounted to slide toward and from each other in the tray to fit and hold the card or other flat object. The holding members are mounted to slide toward and from each other on a thin horizontal metal plate 41 which is stationarily secured in the tray, preferably by engaging the edges of the plate in grooves in the opposite walls of the tray. Each of the holding plates or members 40 shown is provided with down-turned ends 42 which are connected by a cross strap 43 extending beneath the supporting plate 41, and the two holding members are provided at opposite outer edges with upwardly extending inturned lips or flanges 44 adapted to engage and hold the opposite edges of the card or other flat object. A slide 45 is connected to the bottom cross strap of each holding member and is arranged to slide in a guide-way 46 which extends in the direction of movement of the holding members on the underside of the supporting plate 41. These guide-ways are preferably formed by flanged sheet metal strips secured to the underside of the supporting plate and are arranged parallel with each other side by side, so that the slides can move past each other or overlap in the movements of the holding members toward and from each other. The slides 45 are connected by a lever 47 which has studs or screws at its ends arranged to move in transverse slots 48 in the slides, and is provided between its ends with a journal 49 arranged to turn in a suitable bearing in the bottom of the tray. This lever causes the holding members to move simultaneously in opposite directions to an equal extent so that when the members are adjusted toward and from each other to hold a card, they will retain the same in a central position or equally distant from the opposite ends of the holder. A bar or handle 50 is preferably secured to the outer end of the journal 49 for operating the holding members. The holding members can be moved toward and from each other sufficiently to permit a post card or analogous object to be held either in a position extending lengthwise or crosswise of the holder, thus enabling pictures whether placed on the cards in one or another position to be properly placed for exposure in the apparatus. The holding members are also thus adapted to be adjusted so as to fit cards or analogous flat objects which differ in size. By arranging the lever as shown, so that in the intermediate position thereof it extends at right angles to the direction of movement of the holding members, the holding members are permitted a movement sufficient to hold a narrow oblong card either by its short ends or long sides. The card or other object can be readily placed in the holder when the latter is removed from the guide frame, where it can be readily handled and the card adjusted therein, and after the card is placed in the holder it is securely retained in position thereon and the holders can be readily slipped into and out of the guide frame and moved into and out of position for exposure, as above explained.

The projection objective C for the post cards or opaque objects is adjustable vertically for properly focusing it and for this purpose the objective is arranged to slide vertically in a guide tube 51 fixed on top of the casing A. The lens tube with the lenses of this objective and the mirror carried thereby are frequently large and heavy and if the usual rack and pinion arranged at one side of the lens tube are employed for adjusting the objective, the weight of the parts will cause them to lower and prevent them from being held stationary in the adjusted position unless the friction of the adjusting mechanism is so great as to be objectionable in use. On account of the large diameter of the lens tube, it is also liable to bind in its guide and make the adjusting mechanism work hard. In order to overcome these objections and provide means which can be readily and easily operated for adjusting the objective and which will insure the holding of the same in adjusted position, the following construction is employed: 52 represents a vertical plunger or post arranged to slide vertically in a cylinder or tubular guide 53 fixed in any suitable manner on top of the casing A at one side of the objective. The post is provided at one side with a toothed rack, and an adjusting shaft 55 suitably journaled on the guide cylinder is provided with a pinion meshing with the rack for raising and lowering the post. Any other suitable means for adjusting the post may be substituted. The adjusting shaft is provided at its outer end with a finger wheel or other means for turning it. The guide cylinder is preferably slotted transversely at its lower portion as indicated at 57 and is split longitudinally above this slot to permit it to be contracted on the post sufficiently to create the desired friction to oppose the movement of the post. The split portion of the guide tube, as shown, is provided with ears or lugs 58 connected by screws for contracting it on the post. The post is made hollow and a spring inclosed therein between the top of the casing and the upper end of the post tends to lift the post and the parts connected therewith and to yieldingly resist the descent of the same. The post is connected to the lens tube of the objective C, or otherwise associated therewith in any suitable manner, so that the weight of the lens tube and the parts thereon is carried by the adjusting post, and the objective is adjusted by the adjustment of the post. As shown, a connecting ring 60 surrounds the lens tube below a lip or collar 61 thereon and is provided with a split clamping portion which embraces the upper end of the adjusting post and is clamped thereon as by means of a screw 62. This clamp can be readily secured to the post at the required elevation with reference to the lens tube. By this arrangement the spring 59 tends to lift the post and the objective connected thereto and to oppose the descent of these parts. By using a spring which substantially counterbalances the weight of the post and parts connected thereto, the adjusting gear can be turned easily and the parts will nevertheless be supported in the adjusted position without the likelihood of lowering from this position under the force of gravity. Since the adjusting post is of small diameter it is not apt to bind in its guide cylinder and it properly guides the objective. This arrangement also enables the adjusting shaft to be placed lower in a more convenient position than it could be placed on the objective guide tube.

No claims are made herein to the arrangement of the lamp and reflector 16 and to the adjusting means for the lens tube C, these features forming the subject matter of a divisional application filed the 3rd day of November, 1917, Serial No. 200,014.

We claim as our invention:

1. In a projection apparatus, the combination with a light casing having an exposure opening in its bottom, and projection means for projecting an image of an object exposed at said opening, of an object guide extending horizontally beneath said exposure opening lengthwise in the direction of the projection of the image of the object by said projection means, said guide being open at both ends whereby the object for exposure is adapted to be placed in said guide and moved horizontally lengthwise through and out of said guide to and from exposure position relative to said opening in the bottom of the casing, and said guide and casing being constructed and relatively arranged so as not to interfere with the insertion or removal of the object horizontally into or out of the guide.

2. In a projection apparatus, the combination with a light casing having an exposure opening in its bottom, and projection means for projecting an image of an object exposed at said opening, of an object guide extending horizontally beneath said exposure opening lengthwise in the direction of the projection of the image of the object by said projection means, said guide being open at both ends whereby the object for exposure is adapted to be placed in said guide and moved horizontally lengthwise through and out of said guide to and from exposure position relative to said opening in the bottom of the casing, and means for movably supporting said guide and constructed to move the guide up and down beneath the bottom of the casing, said guide, the supporting means and the casing being constructed and relatively arranged so as not to interfere with the insertion or removal of the object horizontally into or out of the guide.

3. In a projection apparatus, the combination with a light casing and projecting means, of a support mounted to move toward and from an exposure opening in the bottom of the casing, a guide frame removably placed on said support, and having parts adapted to engage said support for retaining the guide frame in position on the support and having a horizontal open-ended guideway extending lengthwise beneath the bottom of the casing in the direction of the projection of light by said projecting means and into which object holders are adapted to be inserted at one end and from which they are adapted to be removed at the opposite end, and an object holder provided with means for holding an object adapted to be placed in and moved horizontally through said guideway.

4. In a projection apparatus, the combination with a light casing and projecting means, of a support arranged to move up and down beneath the casing toward and from an exposure opening in the bottom of the casing, a horizontal open ended guide frame removably retained on said support and comprising a bottom plate, and sides connected to said bottom plate and having horizontal guide tracks on which object holders are adapted to be placed and moved horizontally to and from operative position beneath said exposure opening, and an object holder provided with means for holding an object adapted to be placed on and moved horizontally on said guide tracks.

Witness our hands this 25th day of October, 1916.

HARVEY N. OTT.
FRANK H. BUFTON.

Witnesses:
ARTHUR A. HAHN,
THOMAS L. BOURNE.